UNITED STATES PATENT OFFICE.

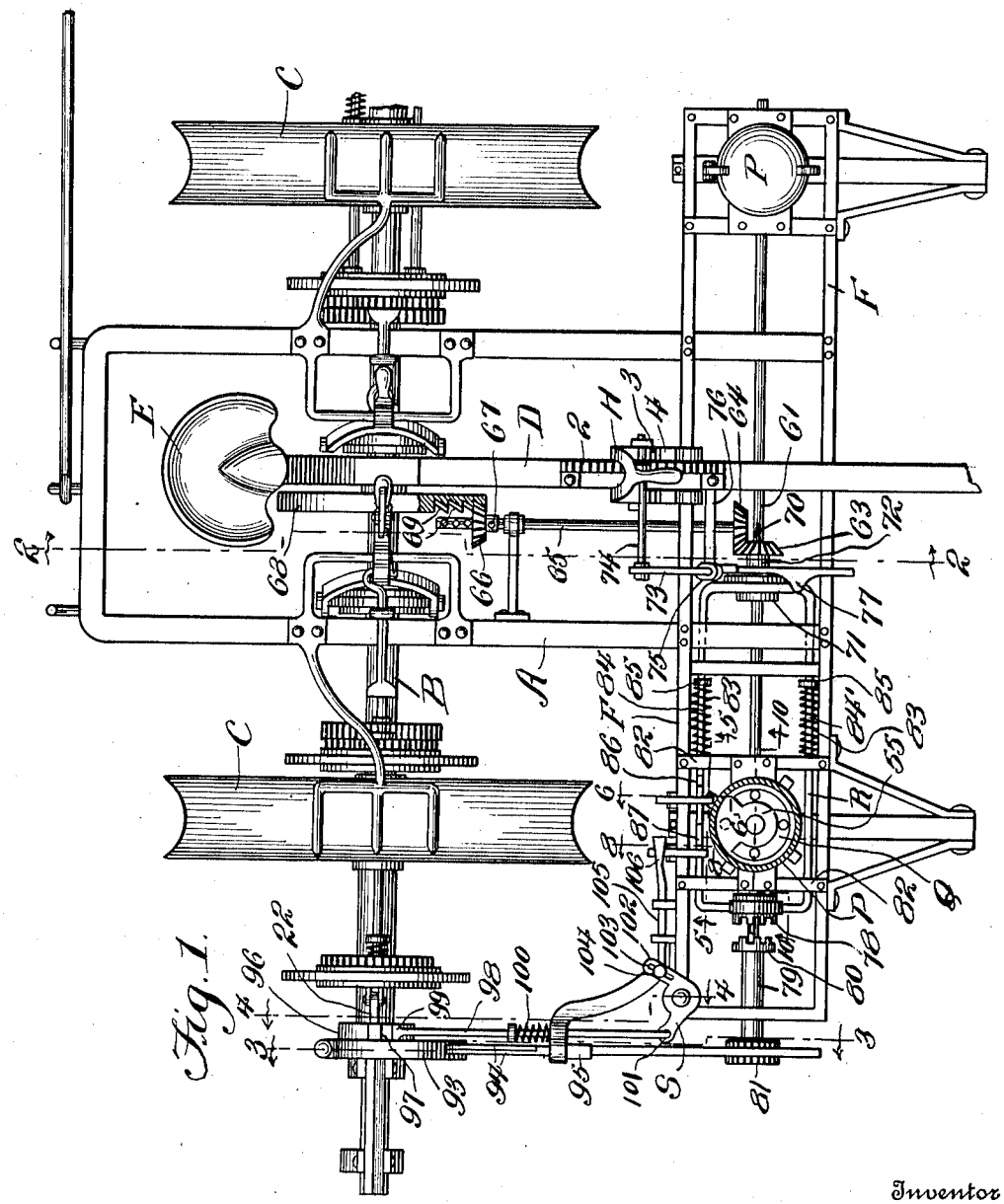

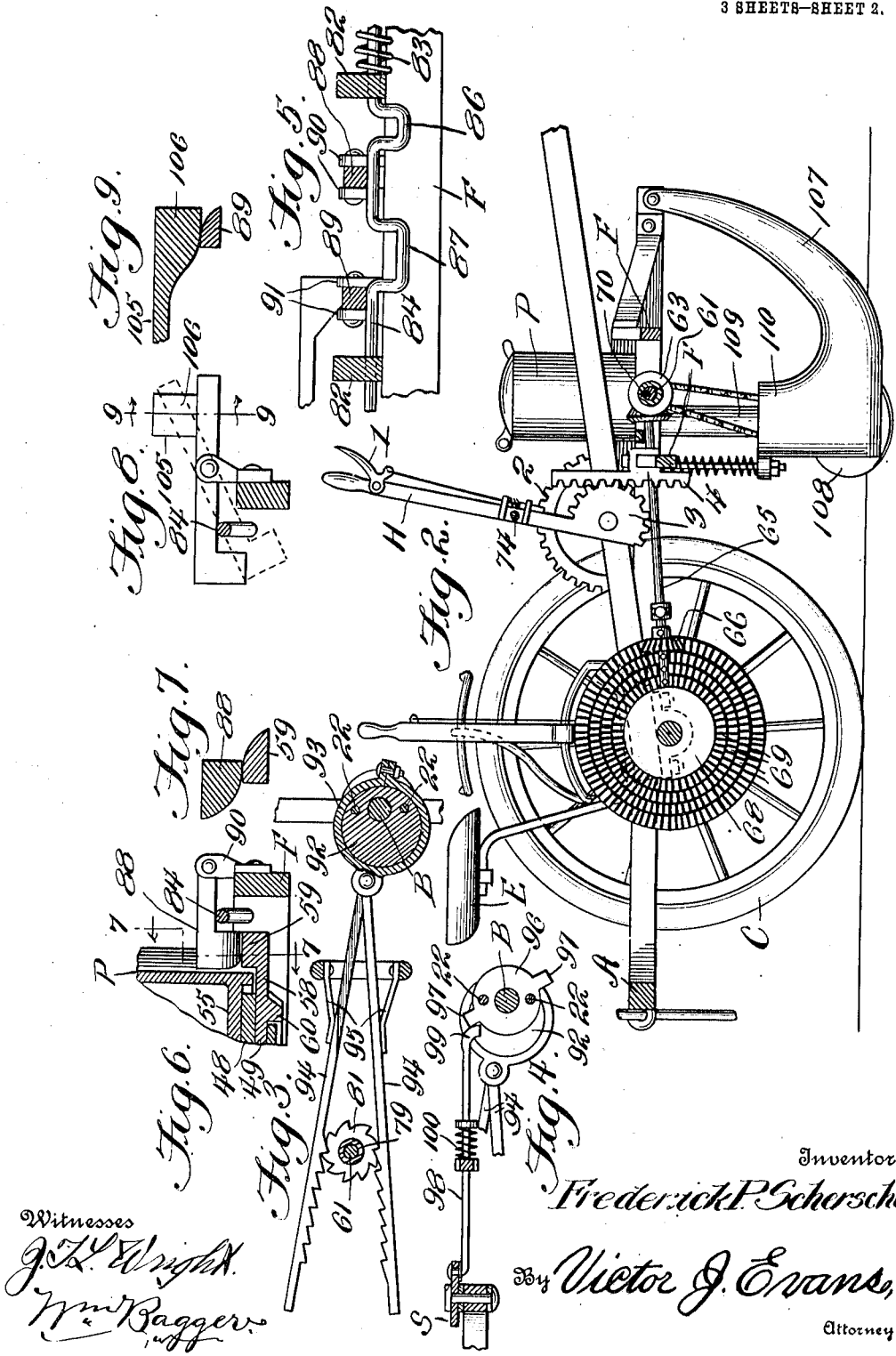

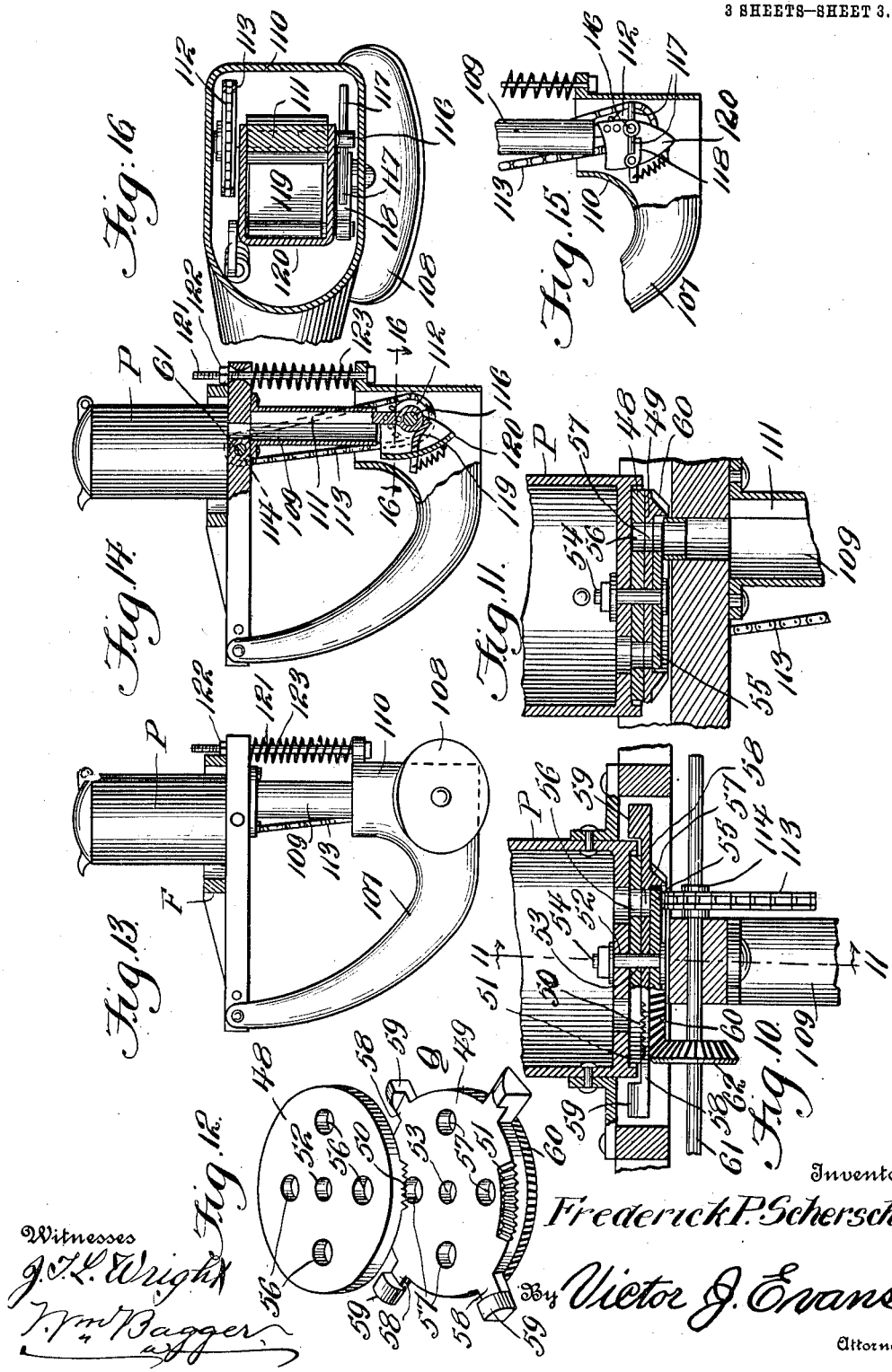

FREDERICK P. SCHERSCHEL, OF BEDFORD, INDIANA.

CORN-PLANTER.

1,054,454. Specification of Letters Patent. Patented Feb. 25, 1913.

Original application filed August 16, 1910, Serial No. 577,421. Divided and this application filed October 19, 1911. Serial No. 655,526.

*To all whom it may concern:*

Be it known that I, FREDERICK P. SCHERSCHEL, a citizen of the United States, residing at Bedford, in the county of Lawrence and State of Indiana, have invented new and useful Improvements in Corn-Planters, of which the following is a specification.

This invention relates to corn planters, and the present application is a division of the application filed by me August 16, 1910, Seral No. 577,421, which was patented Dec. 26, 1911, No. 1,013,071.

The present application has particular reference to the seed feeding devices, and it has for its object to simplify and improve the general construction and operation of the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view partly in section showing as much of a corn planter as is necessary to illustrate the invention. Fig. 2 is a longitudinal vertical sectional detail view taken on the line 2—2 in Fig. 1. Fig. 3 is a sectional detail view taken on the line 3—3 in Fig. 1. Fig. 4 is a sectional detail view taken on the line 4—4 in Fig. 1. Fig. 5 is a sectional detail view taken on the line 5—5 in Fig. 1. Fig. 6 is a sectional detail view taken on the line 6—6 in Fig. 1. Fig. 7 is a sectional detail view taken on the line 7—7 in Fig. 6. Fig. 8 is a sectional detail view taken on the line 8—8 in Fig. 1. Fig. 9 is a sectional detail view taken on the line 9—9 in Fig. 8. Fig. 10 is a vertical sectional detail view through the seed box or hopper taken on the line 10—10 in Fig. 1. Fig. 11 is a vertical sectional view through the seed box or hopper taken on the line 11—11 in Fig. 10. Fig. 12 is a perspective view illustrating the members composing the seed plates separated or detached from the other. Fig. 13 is a detail view in side elevation of one of the seed boxes, together with the furrow opening means. Fig. 14 is a sectional elevation of the parts shown in Fig. 13. Fig. 15 is a side view of the second drop valve and related parts, a portion of the furrow opening shoe or runner being broken away. Fig. 16 is a horizontal sectional detail view enlarged taken on the line 16—16 in Fig. 14.

Corresponding parts in the several figures are denoted by like characters of reference.

The main frame A of the improved machine is supported upon the axle B having the ground wheels C—C one of which may be loose upon the axle for convenience in turning. The tongue D, which is pivotally connected with the axle, carries the driver's seat E. The seeder frame F is suitably mounted transversely upon the front end of the main frame, and said seeder frame may be lowered for operation or raised for transportation by means of a hand lever H which is fulcrumed upon the tongue, said hand lever being provided with a spring-actuated stop member 1 of ordinary well known construction adapted to engage a quadrant 2. The hand lever H is equipped with a toothed segment 3 meshing with a rack bar 4 which is connected with the seeder frame for the purpose of effecting the desired adjustment.

The seeder frame F which may be suitably bolted or otherwise secured upon the side members of the main frame A carries adjacent to each end a seed box or hopper P containing in the bottom thereof a seed plate Q which, as best seen in Fig. 12, is composed of an upper and a lower disk 48, 49 having intermeshing teeth 50, 51, where, when juxtaposed they will be retained against displacement about the axis of said disks. The disks 48 and 49 are provided with central apertures 52, 53, whereby they may be fitted for rotation about a post or pintle 54. A suitable bottom member 55 is also provided. The disks 48 and 49 are each provided with several equidistant apertures 56, 57 combining to form the seed cups, the dimensions of which may be regulated by axial adjustment of one disk with reference to the other. The lower disk 49 is provided with arms 58 extending radially, said arms being suitably spaced with reference to the seed cups and provided at their outer extremities with beveled lugs 59 for a purpose which will presently appear, it being understood that the number of arms 58 corresponds with that of the seed cups. Formed upon the underside of the lower disk 49 is a bevel gear 60.

A shaft 61, which is suitably supported for rotation upon the seeder frame F in parallel relation to the axle of the machine, is provided adjacent to each hopper with a bevel pinion 62 meshing with the bevel gear 60 of the seed plate which will be thereby rotated. The shaft 61 carries a bevel pinion 63 meshing with a corresponding bevel pinion 64 upon a counter shaft 65 which is supported in suitable bearings upon the main frame and the seeder frame. Said shaft 65 carries a bevel pinion 66 which is adjustably mounted thereon, being held in position by a set screw 67. The axle B of the machine carries a wheel or disk 68 having a plurality of series of teeth 69 with any one of which the bevel pinion 66 may be placed in mesh for the purpose of causing the shaft 65 to be rotated at the desired speed relative to the speed of the axle B, thus transmitting motion at the desired speed to the operating shaft 61, which by the means herein described, serves to rotate the seed plates within the hoppers.

For the purpose of enabling the transmission of motion from the axle to the operating shaft to be temporarily interrupted in order that the operating shaft may be independently rotated to permit the seed dropping mechanism to be properly adjusted the bevel pinion 63 is slidably mounted upon the shaft 61 with which it is connected for rotation by means of a spline or feather 70, and said bevel pinion is formed with a hub 71 having an annular groove 72 of sufficient width to enable the hub carrying the bevel pinion to be moved to the desired extent by the means now to be described. The hand lever H mounted on the tongue D carries a pivoted arm 73 which may be spaced from said hand lever by means of a rod 74, see Fig. 1, said arm being guided through a slot 75 in a bracket 76 fixed upon the tongue. The arm 73 is guided in the annular groove 72 of the hub 71, and it carries a beveled lug or hump 77 adapted to engage one side wall of the groove 72, thus forcing the hub 71 in an outward direction upon the shaft 61, and thereby placing the bevel pinion 63 out of mesh with the pinion 64.

Suitably connected with the hub 71 is one end of a yoke or frame R, said frame being connected at its opposite or outer end with a clutch member 78 slidably mounted upon the shaft 61 with which it is connected for rotation by means of a key or spline, it being understood that the clutch member 78, as well as the hub 71, are revoluble with reference to the frame R. A sleeve 79 mounted upon the shaft 61 carries at one end a fixed clutch member 80 adapted to be engaged by the clutch member 78, and at its opposite end the sleeve 79 carries a ratchet wheel 81. The parts are so arranged that when the lever H is actuated to cause the arm 73 to move the hub 71 to a position at which the bevel pinions 63 and 64 are thrown out of mesh, the clutch member 78 will be placed in mesh with the clutch member 80, thus connecting the sleeve 79 with the shaft 61 for rotation therewith. The frame R is guided in cross pieces or bearings 82 upon the seeder frame F, and springs 83 are suitably arranged to force the frame R in an inward direction to place the bevel gears 63, 64 in mesh when unobstructed by the lug 77 of the arm 73. The springs 83 may be coiled about the side members 84, 84′ of the frame R between one of the bearing members 82 and stops 85 upon the side members of the frame. The side member 84 of the frame R is provided with notches 86, 87, see Fig. 5, the notch 86 being relatively narrow and the notch 87 being relatively wide. These notches are adapted to be engaged by dogs or pawls 88, 89 which are pivotally supported upon the seeder frame F which is provided with ears or lugs 90, 91 to support said dogs or pawls. Each of said dogs or pawls is of a width not exceeding that of the notch 86. When the frame R is moved outward against the tension of the springs 83, the dogs 88, 89, which may be spring actuated or which may operate by gravity, will drop into engagement with the notches 86 or 87, and when the dog 88 is disengaged from the notch 86, the frame R will be moved under the impulse of the springs 83 a short distance which is equal to the difference in the width between the notch 87 and the dog 89, which latter will thus serve to arrest or intercept the frame. The parts will be so proportioned that when the frame R is moved outward to its extreme limit, and the dog 88 is in engagement with the notch 86, the bevel pinion 63 will be disengaged from the bevel pinion 64, and the clutch members 78 and 80 will be placed in mesh with each other. When the dog 88 is disengaged from the notch 86, and the frame R is moved until arrested by the dog 89, the said frame R will occupy an intermediate position, and the clutch members 80 and 78, as well as the bevel pinions 63 and 64, will be out of mesh. When the dog 89 is thrown out of engagement with the notch 87, the frame R, as stated, will be moved by the springs 83 to a position at which the bevel pinions 63, 64 are in mesh with each other, while the clutch members 78, 80 are disengaged.

As previously stated, when the bevel pinions 63, 64 are in mesh, motion will be transmitted from the axle of the machine to the seed dropping mechanism, including the rotary seed plates. Assuming now that the machine is to be turned at the end of a row, the hand lever H and the parts connected therewith are actuated to move the frame R against the tension of the spring 33 until the clutch members 78, 80 are in mesh. The axle B carries an eccentric 92 surrounded by a band 93 with which suitably guided and spring pressed pawl bars 94 are pivotally or otherwise suitably connected, said pawl bars being held by the springs 95 in engagement with diametrically opposite sides of the ratchet wheel 81 which latter may thus be rotated. The eccentric 92 is perforated for the passage of the rods 22 which form a part of the adjusting mechanism for the marking devices, not here shown, but which appear in my previous patent hereinbefore referred to, and said rods 22 also extend through a disk 96 mounted for rotation upon the axle adjacent to the eccentric 92, said disk having diametrically opposite tappets 97. A suitably guided spring actuated connecting rod 98 is provided with a head 99 lying in the path of the tappets whereby the rod 98 may be actuated against the tension of the spring 100 for the purpose of operating a bell crank S with one arm of which, 101, the rod 98 is connected. The other arm, 102, of the bell crank S has a slot 103 which receives a guide pin 104 at one end of a slide 105 which is mounted in suitable bearings upon the seeder frame, said slide being provided at one end with a beveled hump or enlargement 106, see Figs. 8 and 9, adapted to engage the pivoted dog 89 for the purpose of throwing the latter at the proper moment out of engagement with the notch 87 to release the frame R. The beveled lugs 59 upon the arms 58 of the lower member 49 of the seed plate are in like manner adapted to engage a correspondingly beveled portion of the dog 88 for the purpose of disengaging the latter at the proper moment from the notch 86 in the seed bar 84 of the frame R.

It will be readily seen that when the frame R is moved to a position where the clutch members 78, 80 are in mesh, the pawl bars 94 will impart rotary motion to the ratchet wheel 81, sleeve 79 and through the clutch composed of the members 78, 80 to the shaft 61 which will thus be rotated, thereby rotating the seed plate until one of the arms 58 having projections 59 strikes the dog 88 to disengage it from the recess 86, thus permitting the frame R to be moved by the springs 83 to an intermediate position at which the clutch members 78, 80, as well as the bevel gears 63, 64 shall be out of mesh. This operation will take place when one of the seed cups is exactly in discharging or seed dropping position, and the shaft 61, as well as the seed plate, now remains stationary until the head 99 of the rod 98 is struck by one of the tappets 97. When the spring actuated rod 98 is operated by the tappet 97 it rocks the bell crank S, thus actuating the slide 105 which in turn actuates the dog 89 to disengage it from the notch 87, thus permitting the frame R to be moved further under the impulse of the springs 83 until the bevel gears 63, 64 are in mesh, thus placing the seed dropping mechanism in connection with the axle of the machine from which it derives motion.

The furrow opening runners 107 are pivotally connected with the seeder frame, and said runners may be equipped with furrow opening disks or fenders 108. The seed tubes 109 extend downwardly from the hoppers and terminate within the chutes 110 of the runners. Within each seed tube 109 extends a bracket 111 carrying a sprocket wheel 112 which is connected by a chain 113 with a sprocket wheel 114 upon the operating shaft 61. The shaft 116 carrying the sprocket wheel 112 is provided with tappets 117 adapted to engage the operating arm 118 of a spring actuated valve 119 arranged within a casing 120 which is disposed below the seed tube 111 to receive the charge coming through the latter, the charge being supported upon the valve 119 until the latter is actuated to drop the charge into the furrow.

The free end of the runner 107 is supported by means of a rod 121 connected adjustably with the frame F by means of a nut 122, said rod being equipped with a spring 123 whereby the runner is normally pressed downward to earth engaging position. The operation of the furrow opening and seed dropping and discharging mechanism will be readily understood by those skilled in the art.

From the foregoing description, taken in connection with the drawings hereto annexed, the operation and advantages of my improved corn planter will be readily understood. The several parts of the device combine to form an organized machine which is simple in construction, easy in operation and thoroughly efficient for the purposes for which it is provided.

Having thus described the invention, what is claimed as new, is:—

1. In a corn planter, a wheel supported main frame carrying a seeder frame, a tongue, means for adjusting the main frame relatively to the tongue including an adjusting lever, seed dropping mechanism, a shaft supported upon the seeder frame for actuating said dropping mechanism, a ground wheel carrying axle, and means for transmitting motion from said axle to the operating shaft including a gear wheel upon the axle, a counter shaft supported by the main frame and having a pinion meshing with the gear wheel, a second pinion upon the counter shaft, a clutch mechanism including a hub slidable upon the operating shaft, said hub having a pinion adapted to mesh with the second pinion upon the counter shaft, and an annular groove, and a suitably guided arm pivotally connected with the adjusting lever, said arm engaging the annular groove of the hub upon the operating shaft and said arm being provided with a hump to engage said hub to move the pinion carried thereby out of engagement with the second pinion upon the counter shaft.

2. In a corn planter, a seeder frame, a wheel carrying axle, a hopper supported upon the seeder frame, an operating shaft supported for rotation upon the seeder frame, a seed disk supported for rotation and having a bevel gear connected therewith, a pinion upon the operating shaft meshing with said bevel gear, means for transmitting motion from the wheel carrying axle to the operating shaft including clutch mechanism, said clutch mechanism including a slidable spring pressed frame, one side member of which is provided with two notches of unequal width, suitably supported spring actuated dogs adapted for engagement with said notches, beveled arms extending from the seed disk and adapted for engagement with one of said dogs to release the latter from notch-engaging position, means for releasing the second dog from notch-engaging position, a clutch member carried by the slidable spring pressed frame, a sleeve supported for rotation upon the operating shaft and carrying a second clutch member adapted to be engaged by the first clutch member, and means connected with the axle of the machine for rotating said sleeve; the slidable frame being adapted to be supported by one of the spring actuated dogs in a position intermediate the clutch member and carried by the revoluble sleeve and the clutch means included in the mechanism for transmitting motion from the axle of the machine to the operating shaft.

3. In a corn planter, a seeder frame, a hopper supported thereon, seed dropping mechanism including an operating shaft extending transversely through the hopper, a seed tube, a bracket extending within the seed tube and carrying a shaft having radial projections, a suitably supported spring actuated foot valve adapted to be actuated by said projections, and means for transmitting motion from the operating shaft to the shaft having the radial projections.

In testimony whereof I affix my signature in presence of two witnesses.

FREDERICK P. SCHERSCHEL.

Witnesses:
   Mrs. F. P. Scherschel,
   Mrs. R. J. Scherschel.